(12) United States Patent
Klemen et al.

(10) Patent No.: US 7,128,675 B2
(45) Date of Patent: Oct. 31, 2006

(54) DUAL PATH ELECTRICALLY-VARIABLE TRANSMISSION

(75) Inventors: Donald Klemen, Carmel, IN (US); Michael R. Schmidt, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 273 days.

(21) Appl. No.: 10/901,673

(22) Filed: Jul. 29, 2004

(65) Prior Publication Data
US 2006/0025259 A1    Feb. 2, 2006

(51) Int. Cl.
*F16H 3/72* (2006.01)
(52) U.S. Cl. .......................................... 475/5
(58) Field of Classification Search .................. 475/5, 475/10, 320; 180/65.6, 65.7
See application file for complete search history.

(56) References Cited

U.S. PATENT DOCUMENTS

| | | | |
|---|---|---|---|
| 5,558,173 A | 9/1996 | Sherman | 180/53.8 |
| 5,558,175 A | 9/1996 | Sherman | 180/65.2 |
| 5,558,589 A | 9/1996 | Schmidt | 475/5 |
| 5,558,595 A | 9/1996 | Schmidt et al. | 477/3 |
| 5,571,058 A | 11/1996 | Schmidt | 475/5 |
| 5,577,973 A | 11/1996 | Schmidt | 475/5 |
| 5,931,757 A | 8/1999 | Schmidt | 475/2 |
| 6,090,005 A | 7/2000 | Schmidt et al. | 475/5 |
| 6,371,882 B1* | 4/2002 | Casey et al. | 477/5 |
| 6,478,705 B1 | 11/2002 | Holmes et al. | 475/5 |
| 6,551,208 B1* | 4/2003 | Holmes et al. | 475/5 |

* cited by examiner

*Primary Examiner*—Sherry Estremsky
(74) *Attorney, Agent, or Firm*—Christopher DeVries

(57) ABSTRACT

An electrically-variable transmission includes an input shaft, an output shaft, two electric motor/generators, and four nodes between which three parallel power paths are defined. Two of the power paths are mechanical and one of the power paths is electrical. The electric motor generators provide continuously variable speed ratios; manipulation of the power paths at the nodes provides a plurality of continuously variable operating modes for increased efficiency and smaller motor size. The transmission also provides an equal forward/reverse system with an input split.

7 Claims, 3 Drawing Sheets

DUAL PATH ELECTRICALLY-VARIABLE TRANSMISSION

TECHNICAL FIELD

This invention relates to a transmission that includes four nodes and three parallel power paths, including two mechanical power paths and an electrical power path, between an input shaft and an output shaft.

BACKGROUND OF THE INVENTION

An electrically-variable transmission (EVT) splits mechanical power between an input shaft and an output shaft into a mechanical power path and an electrical power path by means of differential gearing. The mechanical power path may include clutches and additional gears. The electrical power path may employ two electrical power units, each of which may operate as a motor or as a generator. With an electric storage battery, the EVT can be incorporated into a propulsion system for a hybrid electric vehicle.

The hybrid vehicle or hybrid propulsion system uses an electrical power source, such as batteries, as well as an engine power source. The batteries are connected with the electrical drive units through an electronic control unit (ECU), which distributes the electrical power as required. The ECU also has connections with the engine and vehicle to determine operating characteristics, or operating demand, so that the electrical power units are operated properly as either a motor or a generator. When operating as a generator, the electrical power unit accepts power from either the vehicle or the engine and stores power in the battery, or provides that power to operate another electrical device or another electrical power unit on the vehicle or on the transmission.

There have been a number of electrically-variable transmissions proposed for vehicle operation. Examples of proposed electrically-variable transmissions are shown in U.S. Pat. No. 5,558,589 issued to Schmidt on Sep. 24, 1996, and assigned to the assignee of the present invention; U.S. Pat. No. 6,090,005 issued to Schmidt et al. on Jul. 8, 2000, and assigned to the assignee of the present invention; and U.S. Pat. No. 5,931,757 issued to Schmidt on Aug. 3, 1999, and assigned to the assignee of the present invention. The above-identified U.S. Pat. No. 5,931,757 defines the structure and operation of a variable two-mode, input-split, electro-mechanical transmission for a parallel hybrid electric propulsion system. U.S. Pat. No. 5,558,589 discloses a two-mode, compound-split, electro-mechanical vehicular transmission, and U.S. Pat. No. 5,558,595 issued to Schmidt et al. on Sep. 24, 1996, discloses a one-mode, input-split transmission. These and other patents describe various electrically-variable type transmissions.

One of the benefits of having an electrically-variable transmission incorporating more than one mode of operation is that each mode of operation will generally incorporate at least one mechanical point where one of the electrical power units is stationary, thereby reducing the electrical power input and providing a pure mechanical power flow path which is, of course, more efficient than a pure electrical power flow path.

Other hybrid type power transmissions are shown in U.S. Pat. No. 5,571,058 issued to Schmidt on Nov. 5, 1996; U.S. Pat. No. 5,577,973 issued to Schmidt on Nov. 26, 1996; U.S. Pat. No. 5,558,173 issued to Sherman on Sep. 24, 1996; and U.S. Pat. No. 5,558,175 issued to Sherman on Sep. 24, 1996, all of which are assigned to the assignee of the present invention.

SUMMARY OF THE INVENTION

A vehicle transmission is provided. The transmission includes an input member, an output member, a stationary member, four nodes, a first electric motor/generator, a second electric motor/generator, and an energy storage device. A first node is operatively connected to the input member. A rotatable interconnecting member forms a mechanical first power path between the first node and a second node. A rotatable interconnecting member interconnects the first node and a third node. A rotatable interconnecting member interconnects the third node and a fourth node and forms a mechanical second power path parallel to the first power path. A rotatable interconnecting member operatively interconnects the fourth node and the second node.

The first motor/generator is operatively connected to the third node, and the second motor/generator is operatively connected to the fourth node. The energy storage device operatively interconnects the first motor/generator and the second motor/generator such that the energy storage device and the first and second motor/generators at least partially form an electrical third power path parallel to the first and second power paths between the third and fourth nodes.

The third and fourth nodes, the first and second motor generators, and the energy storage device are substantially similar in design and function to EVTs. The addition of the first and second nodes and the first mechanical power path parallel to an EVT enables the various EVT modes to be reused. Thus, a two-mode EVT may become a four-mode EVT with the addition of the first and second nodes and the first power path. Mechanical points are thus increased compared to the prior art, thereby increasing efficiency and reducing motor torques. Equal forward and reverse performance is also enabled with a simple input split power flow configuration.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
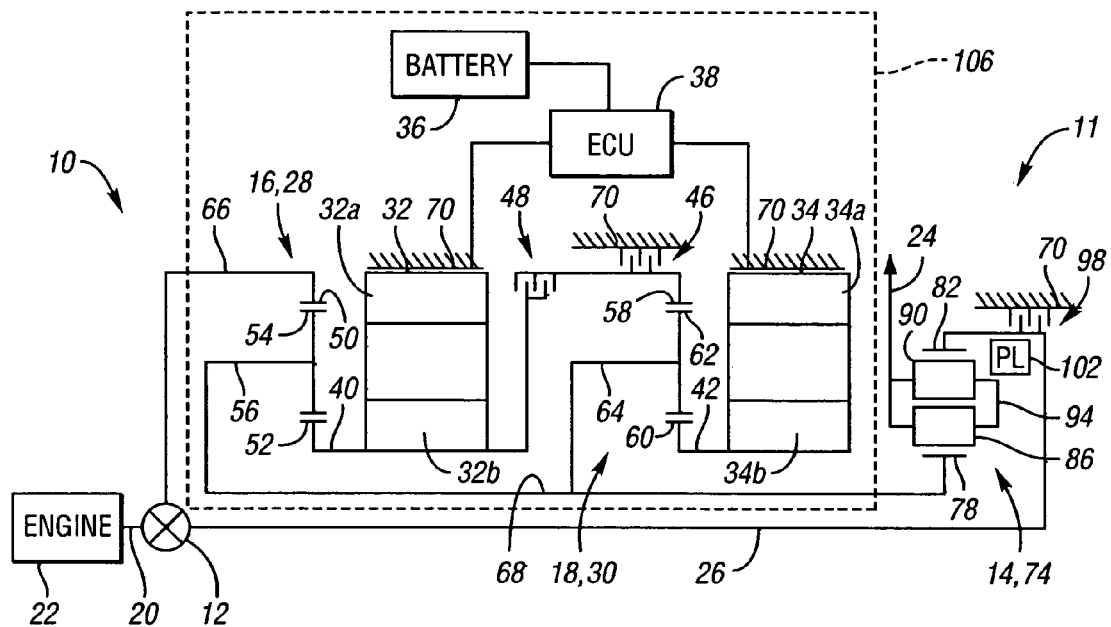
FIG. 1 is a schematic illustration of a vehicle transmission according to the invention.

Referring to FIG. 1, the reference numeral 10 generally designates a hybrid electric powertrain including a transmission 11. The transmission 11 includes a first node 12, a second node 14, a third node 16, and a fourth node 18. In the context of the present invention, a "node" is a junction of three or more power paths through which power is distributable between or among the power paths. For example, a "node" may receive power from a power path and distribute the power between or among two separate power paths. Similarly, a "node" may receive power from two power paths and transmit the power to a third power path. Examples of devices that may function as nodes include a planetary gearset with a sun, ring, and carrier, a dual path clutch, a differential, a Ravigneaux gearset, etc. Power paths may include input shafts, output shafts, electric motor/generators, rotatable interconnecting members, etc.

The first node 12 is operatively connected to an input member, i.e., input shaft 20, which, in the embodiment depicted, is also the output shaft of engine 22. Engine 22 may take a variety of different forms, but as explained below, is preferably designed for constant speed operation during forward vehicle motion subsequent to a vehicle launch phase.

The first node 12 is a dual path clutch in the embodiment depicted, but may have other configurations within the scope of the claimed invention. For example, the first node 12 may include a reduction planetary gearset. An output member, i.e., output shaft 24, is operatively connected to the second node 14, which, in the embodiment depicted, is a compound planetary gearset. Output shaft 24 of transmission 11 is also operatively connected to vehicle drive wheels (not shown).

A first rotatable interconnecting member, i.e., shaft 26, interconnects the first and second nodes 12, 14 and forms a mechanical first power path from the input shaft 20 to the output shaft 24.

The third node 16 includes planetary gearset 28, and the fourth node 18 includes planetary gearset 30. The transmission 11 also includes first and second electrical machines 32, 34, i.e., electric motor/generators, coupled to the gearsets 28, 30. Electrical machines 32 and 34 are coaxially aligned with the gearsets 28, 30 as shown. An electrical storage device, such as battery 36, is provided for supplying current to machines 32 and/or 34 when operating in a motoring mode, and receiving charging current from machines 32 and/or 34 when operating in a generating mode. An electronic control unit (ECU) 38, including a microprocessor-based controller and suitable inverter circuitry, couples the battery 36 to machines 32, 34, and controls the same in response to various input signals, including the driver torque request signal (not shown) and the output shaft speed signal (not shown). In a preferred embodiment, the machines 32, 34 are configured as induction machines, although other configurations are also possible. Thus, machine 32 is depicted as having a fixed stator 32a electrically coupled to ECU 38 and a rotor 32b mounted on a sleeve shaft 40. Similarly, machine 34 is depicted as having a fixed stator 34a electrically coupled to ECU 38 and a rotor 34b mounted on sleeve shaft 42.

In addition to the planetary gearsets 28, 30, the transmission 11 includes a pair of selectively engageable friction clutches 46, 48. In customary fashion, each planetary gearset 28, 30 includes an outer (ring) gear circumscribing an inner (sun) gear, and a plurality of planet gears rotatably mounted on a carrier such that the planet gears meshingly engage both the outer gear and the inner gear. Thus, the gearset 28 includes a ring gear 50, a sun gear 52, and a set of planet gears 54 mounted on a carrier 56; the gearset 30 includes a ring gear 58, a sun gear 60, and a set of planet gears 62 mounted on a carrier 64.

A second interconnecting member 66 interconnects the first node 12 and the ring gear 50, and in the embodiment depicted the first node 12 provides direct connection of shaft 20 to ring gear 50. The planet carriers 56 and 64 are interconnected for common rotation with a third interconnecting member, i.e., sleeve 68. Thus, sleeve 68 interconnects the third node 16 and the fourth node 18, and provides a mechanical second parallel power path from the input shaft 20 and the output shaft 24.

Sun gear 52 is coupled to the rotor 32b of electric machine 32 via sleeve shaft 40, and the sun gear 60 is coupled to the rotor 34b of electric machine 34 via sleeve shaft 42. Clutch 46 selectively couples the ring gear 58 to a stationary member, i.e., transmission housing 70. Clutch 48 selectively couples the ring gear 58 to the sleeve shaft 40. Thus, sleeve 40 also forms a mechanical power path between the third node and the fourth node when clutch 48 is engaged. Within the scope of the claimed invention, an "interconnecting member" that interconnects two nodes may or may not cooperate with one or more other interconnecting members to interconnect the two nodes. Furthermore, and within the scope of the claimed invention, a power path may or may not be interruptable by a selectively engageable torque transmitting device, such as clutch 48.

Electric machines 32, 34 are electrically interconnected via battery 36. Machines 32, 34 and battery 36 thus partially form an electrical third parallel power path between the third node 16 and the fourth node 18. The first, second, and third power paths are parallel to one another, and define power paths through the transmission 11 between the input shaft 20 and the output shaft 24.

The second node 14 includes a compound planetary gearset 74 having sun gear 78, ring gear 82, a first set of planet gears 86 meshingly engaged with the sun gear 78, and a second set of planet gears 90 meshingly engaged with the first set of planet gears 86 and the ring gear 82. The first and second set of planet gears 86, 90, are rotatably mounted on planet carrier 94. Sleeve 68 is coupled to sun gear 78 for rotation therewith, and shaft 26 is coupled to ring gear 82 for rotation therewith. Clutch 98 is selectively engageable to couple ring gear 82 with housing 70. A planetary lock clutch 102 is selectively engageable to couple planet carrier 94 and ring gear 82. The planet carrier 94 is coupled to output shaft 24.

It should be noted that subsystem 106 of the transmission 11, including the third node 16, the fourth node 18, the electric machines 32, 34, and battery 36, is substantially similar in configuration and function to the electronically variable transmission described in U.S. Pat. No. 6,478,705, issued Nov. 12, 2002 to Holmes et al, which is hereby incorporated by reference in its entirety. The compound planetary gearset 74 is employed to provide additional modes to the EVT of the '705 patent by reusing the EVT modes and to provide equal forward/reverse output torque.

Figure 2:
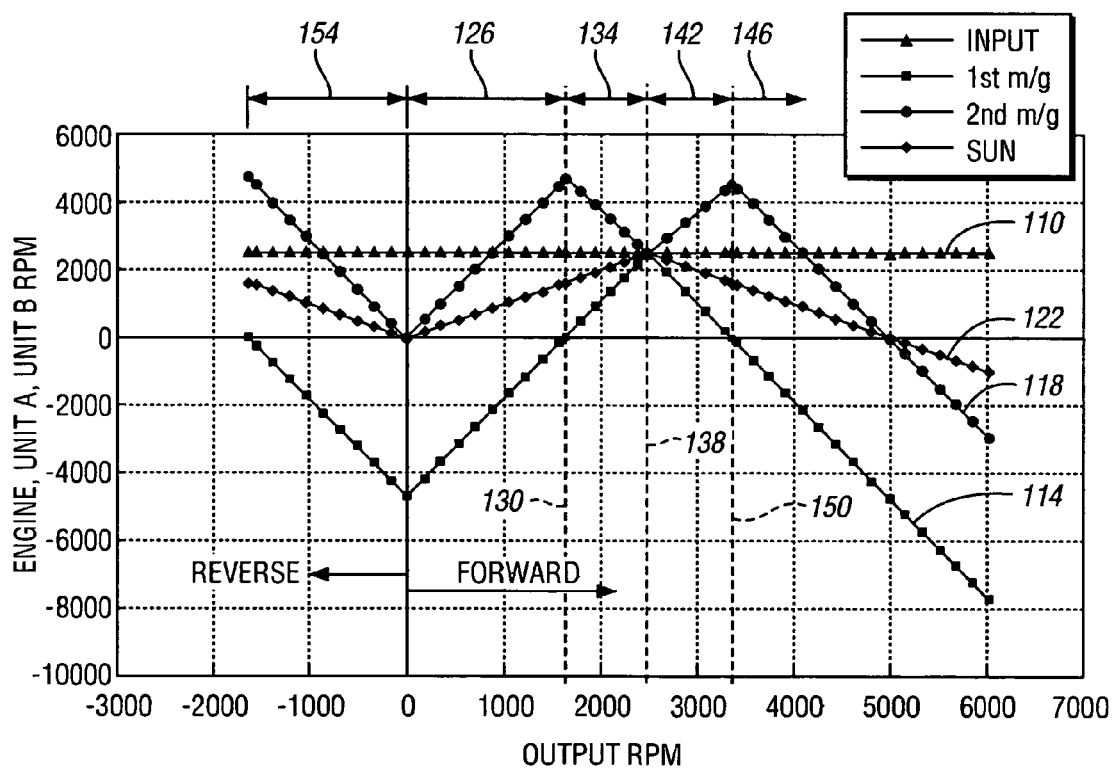
FIG. 2 is a graphical representation of the speeds of elements of the transmission of FIG. 1 in an exemplary operation of the vehicle transmission.

FIG. 2 is a graphical depiction of the speeds of various transmission components with respect to the speed of the output shaft in an exemplary operation of transmission 11. Referring to FIGS. 1 and 2, the speed of the input shaft 20 is depicted by line 110, the speed of electric machine 32 is depicted by line 114, the speed of electric machine 34 is depicted by line 118, and the speed of sun gear 78 is depicted by line 122. In a first forward range or mode 126 of CVT operation, i.e., prior to output shaft speed 130, the dual path clutch of the first node 12 is open, clutch 46 is engaged, clutch 48 is disengaged, and clutch 102 is engaged. Gearset 28 operates in a differential mode, and gearset 30 operates in a torque multiplication mode. Input shaft speed 110, and correspondingly the speed of the engine, is substantially constant throughout the operation of the transmission to simplify description. The ECU causes the speed of the electric machine 32 to start at a negative value and increase with increasing output shaft speed. Simultaneously, the speed of the electric machine 34 starts at zero and increases with increasing output shaft speed. The speed of sun gear 78 rises proportionally with the output shaft speed. This is the same first mode operation in forward or reverse, as selected at the second node 14.

At output shaft speed 130, the speed of electric machine 32 is zero, and the transmission is shifted from the first CVT range or mode 126 to a second CVT range or mode 134. At such point, the speeds of sun gear 52 and ring gear 58 are substantially equal due to the engagement of clutch 46, so that clutch 48 is engaged (and clutch 46 disengaged) with essentially no resulting torque disturbance to shift from the first mode to the second mode. In the second mode, the speed of electric machine 32 continues to increase with increasing output shaft speed, and the speed of electric machine 34 decreases with increasing output shaft speed. The speed of sun gear 78 continues to increase. Once a 1:1 ratio is achieved, at speed 138, the dual path clutch at the first node 12 is synchronously engaged and clutch 102 is synchronously disengaged, since all elements in the transmission path are rotating at the same speed, to commence a third mode 142 of operation. Once the dual path clutch is engaged, the output from sun gear 78 is slowed down, effectively working backwards through the first mode and the second mode. A fourth mode 146 begins when the speed of electric machine 32 is zero at output speed 150, clutch 48 is disengaged, and clutch 46 is engaged.

The transmission 11 is also characterized by a reverse mode 154. At zero output speed, either the planet lock clutch 102 or clutch 98 is selected. The ratio of the compound planetary gearset 74 is such that when holding ring gear 82, a negative unity ratio is achieved. Thus, the EVT path may be operated precisely as it is in the forward first mode, thereby providing equal reverse.

Figure 3:
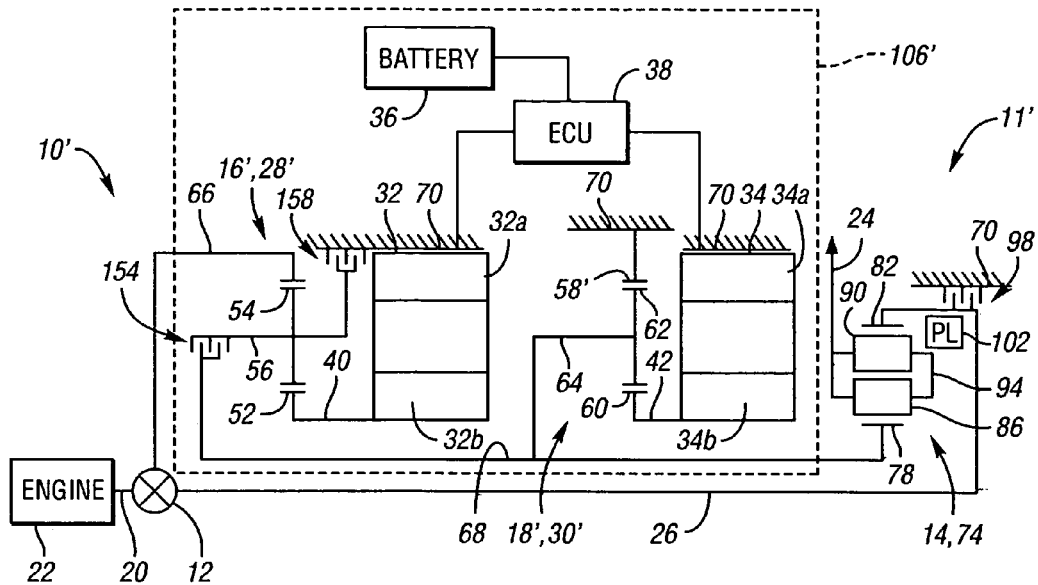
FIG. 3 is a schematic illustration of an alternative transmission configuration.

Referring to FIG. 3, wherein like reference numbers refer to like components from FIG. 1, an alternative transmission 11' having an alternative EVT subsystem 106' is schematically depicted. Subsystem 106' does not include the clutches 46, 48 of FIG. 1; rather, ring gear 58' is rigidly mounted to housing 70. Subsystem 106' also includes a carrier lock 154 to selectively couple the carrier 56 to shaft 68 for rotation therewith. Clutch 158 selectively couples carrier 56 to housing 70. Carrier lock 154 and clutch 158 allows the engine to be started by electric machine 32 with the mechanical output from the third node 16 disconnected. Subsystem 106' provides only a single mode input split. The operation of subsystem 106' is substantially similar to the EVT described in U.S. Pat. No. 5,558,595, issued Sep. 24, 1996 to Schmidt et al, which is hereby incorporated by reference in its entirety.

Figure 4:
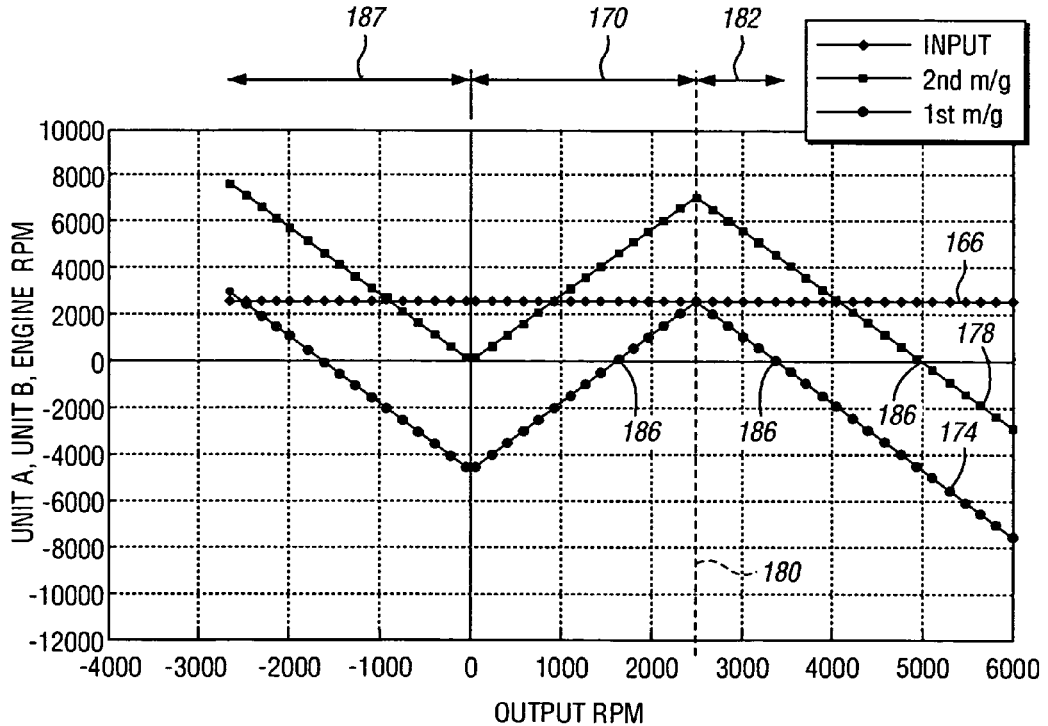
FIG. 4 is a graphical representation of the speeds of elements of the transmission of FIG. 3 in an exemplary operation of the vehicle transmission.

Referring to FIG. 4, an exemplary operation of the transmission of FIG. 3 is schematically depicted. Input shaft speed, depicted by line 166, is held substantially constant to simplify description. In a first forward mode 170, the dual path clutch is open, and the planet lock 102 is applied. With the engine 22 on, clutch 154 is also engaged. Should the engine be off, clutch 158 may be engaged to enable unit 32 to provide a quick start means. The speed of electric machine 32, depicted by line 174, is negative and increases in speed with increasing output shaft speed. The speed of electric machine 34, depicted by line 178, starts at zero and increases with increasing output shaft speed. The dual path clutch is applied at output shaft speed 180, when the speed of electric machine 32 equals the speed of input shaft 20, to commence a second mode 182 of operation at which time clutch 102 is synchronously released and the dual path clutch at node 12 is synchronously engaged. As in the first embodiment, the transmission subsystem 106' then slows the sun gear 78 to increase output speed. It should be noted that three mechanical points 186 result from the operation of the transmisison of FIG. 3. A reverse mode 187 is also achieved similar to that as described in the first embodiment.

Figure 5:
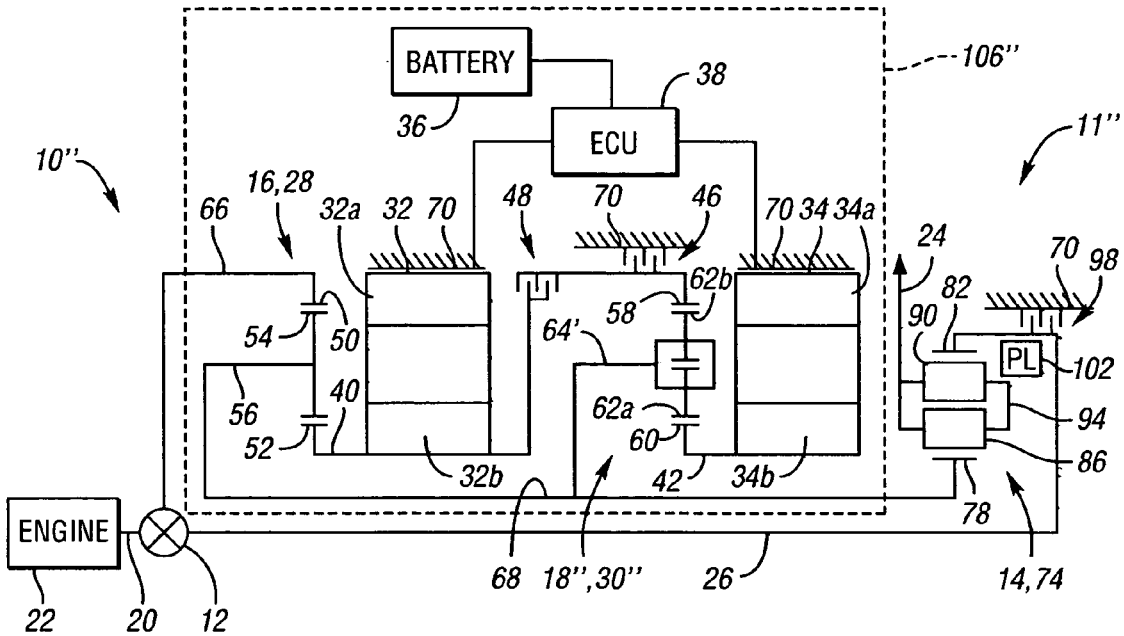
FIG. 5 is a schematic illustration of another alternative transmission configuration.
Figure 6:
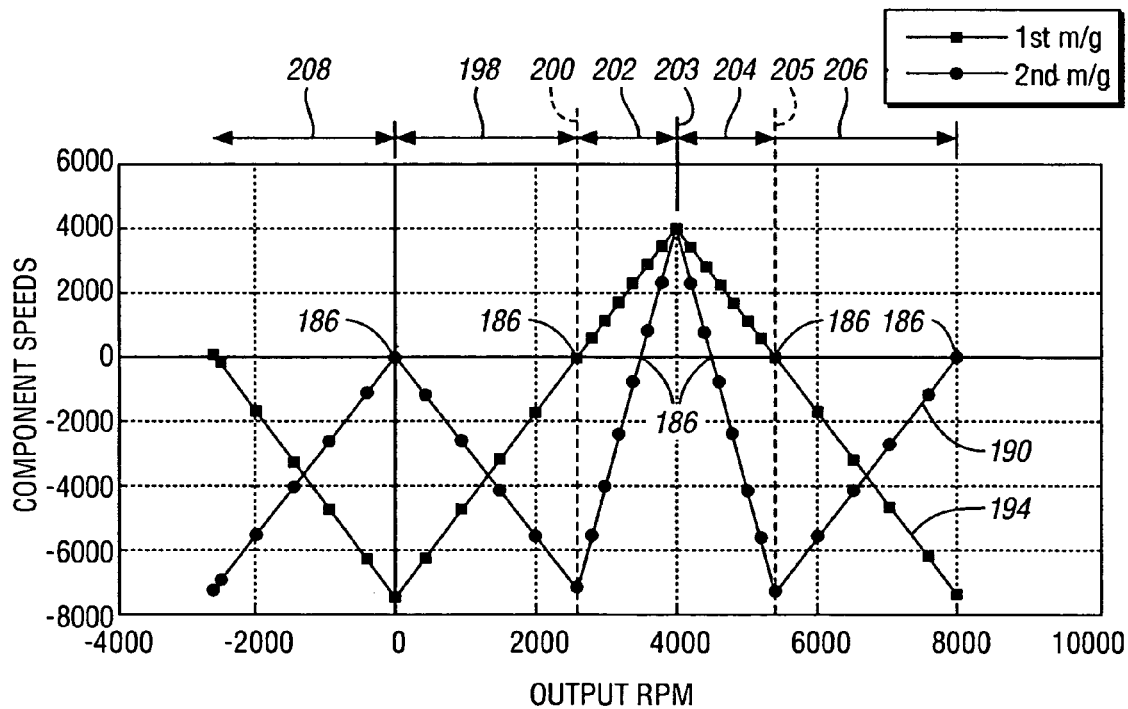
FIG. 6 is a graphical representation of the speeds of elements of the transmission of FIG. 5 in an exemplary operation of the vehicle transmission.

Referring to FIG. 5, yet another alternative powertrain 10" configuration is schematically depicted. The powertrain 10" of FIG. 5 is substantially identical to the powertrain 10 of FIG. 1, except that the planetary gearset 30" of the fourth node 18" is compound. More specifically, a first set of planet gears 62a mesh with sun gear 60, and a second set of planet gears 62b mesh with the first set of planet gears 62a and with the ring gear 58. The first and second sets of planet gears 62a, 62b are rotatably mounted on carrier 64', which is connected to shaft 68. An exemplary operation of powertrain 10" is schematically depicted in FIG. 6, with the speed of electric machine 32 with respect to output shaft speed depicted by line 194, and the speed of electric machine 34 with respect to output shaft speed depicted by line 190. In a first mode 198, the planet lock 102 is engaged, the dual path clutch 12 is open, clutch 46 is engaged and clutch 48 is disengaged. Both electric machines 32, 34 operate at negative speeds, with electric machine 32 starting at a negative value and increasing with increasing output speed, and electric machine 34 starting at zero speed and decreasing with increasing output speed.

When the speed of electric machine 32 equals zero at output speed 200, clutch 48 is engaged and clutch 46 is disengaged to begin a second mode 202 of powertrain operation, in which the speed of electric machine 32 continues to increase, and the speed of electric machine 34 increases with increasing output shaft speed. When the speeds of electric machine 32 and electric machine 34 are the same at output speed 203, the dual path clutch 12 is engaged and clutch 102 is disengaged to start a third mode 204, wherein the speed of electric machines 32, 34 decrease with increasing output shaft speed. When the speed of electric machine 32 is zero at output speed 205, clutch 48 is disengaged and clutch 46 is engaged to commence a fourth mode 206. It should be noted that the arrangement of powertrain 10" and the operation depicted in FIG. 6 provide six mechanical points 186. A reverse mode 208 is acheieved similar to that as described in the embodiment of FIGS. 1 and 2.

While the best modes for carrying out the invention have been described in detail, those familiar with the art to which this invention relates will recognize various alternative designs and embodiments for practicing the invention within the scope of the appended claims.

The invention claimed is:

1. A transmission for a vehicle, the transmission system comprising:

an input member; an output member; a first node operatively connected to the input member; a second node operatively connected to the output member; a third node; a fourth node; a plurality of rotatable interconnecting members, one of said rotatable interconnecting members at least partially forming a mechanical first power path between the first node and the second node; one of said rotatable interconnecting members operatively interconnecting the first node and the third node; one of said rotatable interconnecting members operatively interconnecting the third node and the fourth node and at least partially forming a mechanical second power path; one of said rotatable interconnecting members operatively interconnecting the fourth node and the second node; a first motor/generator operatively connected to the third node, a second motor/generator operatively connected to the fourth node; and an energy storage device operatively interconnecting the first motor/generator and the second motor/generator such that the energy storage device and the first and second motor/generators at least partially form an electrical third power path between the third and fourth nodes.

2. The transmission of claim 1, wherein the third node includes a first planetary gearset having first, second, and third members; and wherein the first member of the first planetary gearset is operatively connected to the first node to receive mechanical power therefrom, the second member of the first planetary gearset is operatively connected to the fourth node to transfer mechanical power thereto, and the first electric motor/generator is operatively connected to the third member of the first planetary gearset.

3. The transmission of claim 2, wherein the fourth node includes a second planetary gearset having first, second, and third members; and wherein the first member of the second planetary gearset is operatively connected to the first planetary gearset to receive mechanical power therefrom, wherein the second motor/generator is operatively connected to the second member of the second planetary gearset, and wherein the third member of the second planetary gearset is operatively connected to the second node to transfer mechanical power thereto.

4. The transmission of claim 1, wherein the second node is a compound planetary gearset having a sun member, a ring member, and a carrier.

5. The transmission of claim 4, further comprising a stationary member; a first torque transmitting mechanism configured to selectively interconnect the ring member and the stationary member; and a second torque transmitting member selectively interconnecting the carrier and the ring member; and wherein the sun member is operatively connected to the fourth node; and the output member is operatively connected to the carrier.

6. A transmission comprising:
an input member; an output member; a stationary member; a first node operatively connected to the input member; a second node operatively connected to the output member and including a compound planetary gearset having a sun gear, a ring gear, and compound planetary gearing rotatably mounted to a carrier and meshingly engaging the sun gear and the ring gear; a third node; a fourth node; a plurality of rotatable interconnecting members, one of said rotatable interconnecting members at least partially forming a mechanical first power path between the first node and the second node; one of said rotatable interconnecting members operatively interconnecting the first node and the third node; one of said rotatable interconnecting members operatively interconnecting the third node and the fourth node and at least partially forming a mechanical second power path; one of said rotatable interconnecting members operatively interconnecting the fourth node and the second node; a first motor/generator operatively connected to the third node, a second motor/generator operatively connected to the fourth node; and an energy storage device operatively interconnecting the first motor/generator and the second motor/generator such that the energy storage device and the first and second motor/generators at least partially form an electrical third power path between the third and fourth nodes; a planet lock clutch configured to selectively couple the ring gear to the carrier; and a reverse clutch configured to selectively couple the ring gear to the stationary member.

7. A transmission comprising:
an input member; an output member; a stationary member; a dual path clutch operatively connected to the input member; a first planetary gearset having a sun gear, a ring gear, and compound planetary gearing rotatably mounted to a carrier and meshingly engaging the sun gear and the ring gear, the first planetary gearset being operatively connected to the output member; a second planetary gearset and a third planetary gearset; a plurality of rotatable interconnecting members, one of said rotatable interconnecting members at least partially forming a mechanical first power path between the dual path clutch and the first planetary gear set; one of said rotatable interconnecting members operatively interconnecting the dual path clutch and the second planetary gearset; one of said rotatable interconnecting members operatively interconnecting the second and third planetary gearsets and at least partially forming a mechanical second power path; one of said rotatable interconnecting members operatively interconnecting the first and third planetary gearsets; a first motor/generator operatively connected to the second planetary gearset; a second motor/generator operatively connected to the third planetary gearset; and an energy storage device operatively interconnecting the first motor/generator and the second motor/generator such that the energy storage device and the first and second motor/generators at least partially form an electrical third power path between the second and third planetary gearsets; a planet lock clutch configured to selectively couple the ring gear to the carrier; and a reverse clutch configured to selectively couple the ring gear to the stationary member.

* * * * *